US012767210B2

(12) United States Patent
Pacheco Escobedo et al.

(10) Patent No.: US 12,767,210 B2
(45) Date of Patent: Oct. 20, 2026

(54) SYSTEMS AND METHODS FOR STEERING WHEEL CONTROL DURING AUTONOMOUS STEERING OF A VEHICLE

(71) Applicant: GM GLOBAL TECHNOLOGY OPERATIONS LLC, Detroit, MI (US)

(72) Inventors: Mauro Pacheco Escobedo, Troy, MI (US); Michael C. Gaunt, Metamora, MI (US); Travis Steve Larson, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 18/956,981

(22) Filed: Nov. 22, 2024

(65) Prior Publication Data

US 2026/0145729 A1 May 28, 2026

(51) Int. Cl.

*B62D 5/00* (2006.01)
*B60W 30/182* (2020.01)
*B60W 50/08* (2020.01)
*B60W 50/14* (2020.01)
*B60W 60/00* (2020.01)

(52) U.S. Cl.

CPC ........... *B62D 5/006* (2013.01); *B60W 30/182* (2013.01); *B60W 50/082* (2013.01); *B60W 50/14* (2013.01); *B60W 60/0053* (2020.02); *B60W 2050/146* (2013.01); *B60W 2540/18* (2013.01)

(58) Field of Classification Search

CPC ... B62D 5/006; B60W 30/182; B60W 50/082; B60W 50/14; B60W 60/0053; B60W 2050/146; B60W 2540/18

See application file for complete search history.

(56) References Cited

U.S. PATENT DOCUMENTS 10,259,495 B2 * 4/2019 Badiru ................. B62D 5/0421
11,142,242 B2 * 10/2021 Kim ....................... B60N 2/002

(Continued)

FOREIGN PATENT DOCUMENTS

DE 102019109170 A1 10/2020
DE 102019135047 A1 6/2021

(Continued)

*Primary Examiner* — Logan M Kraft
*Assistant Examiner* — Sherman D Manley
(74) *Attorney, Agent, or Firm* — Ingrassia Fisher & Lorenz, LLP | IFL

(57) ABSTRACT

Systems and methods are provided for maintaining a steering wheel position during autonomous vehicle steering. The systems include a road wheel actuator configured to turn wheels of the vehicle and thereby adjust a road wheel angle, a steering wheel actuator configured to rotate a steering wheel of the vehicle and thereby adjust a steering wheel angle, and a controller configured to, by one or more processors: maintain the steering wheel in a stationary position while the vehicle is operating in an autonomous mode wherein steering is controlled by the vehicle, determine to switch from the autonomous mode to a manual mode wherein steering is controlled by a driver with the steering wheel, and perform a synchronization process configured to synchronize the steering wheel angle and the road wheel angle in accordance with a predetermined steering ratio by using the road wheel actuator and/or the steering wheel actuator.

20 Claims, 6 Drawing Sheets

(56) References Cited

U.S. PATENT DOCUMENTS

| | | | | |
|---|---|---|---|---|
| 11,338,848 | B2 * | 5/2022 | Stahl | G05D 1/0061 |
| 12,084,121 | B2 * | 9/2024 | Albrecht | B62D 5/006 |
| 2003/0088351 | A1 * | 5/2003 | Augustine | B62D 6/008<br>180/443 |
| 2004/0236487 | A1 * | 11/2004 | Yao | B62D 6/002<br>180/443 |
| 2014/0200770 | A1 * | 7/2014 | Bahena | B62D 6/002<br>701/41 |
| 2020/0277004 | A1 * | 9/2020 | Zheng | B62D 5/0463 |
| 2020/0398891 | A1 * | 12/2020 | Szepessy | B62D 15/021 |
| 2021/0214005 | A1 * | 7/2021 | O'Dea | B62D 15/024 |
| 2021/0371007 | A1 * | 12/2021 | Collier-Hallman | B62D 6/002 |
| 2021/0394821 | A1 * | 12/2021 | Kakimoto | B62D 5/0481 |
| 2021/0394824 | A1 * | 12/2021 | Kakimoto | B62D 5/001 |
| 2022/0144295 | A1 * | 5/2022 | Hwang | B60W 10/20 |
| 2022/0388569 | A1 * | 12/2022 | Uchino | B62D 5/0463 |
| 2023/0011119 | A1 * | 1/2023 | Uchino | B62D 6/008 |
| 2023/0017618 | A1 * | 1/2023 | Albrecht | B62D 5/006 |

FOREIGN PATENT DOCUMENTS

| | | | |
|---|---|---|---|
| DE | 102021117307 | A1 | 5/2022 |
| EP | 4137387 | A1 | 2/2023 |
| WO | 2021122160 | A1 | 6/2021 |

* cited by examiner

SYSTEMS AND METHODS FOR STEERING WHEEL CONTROL DURING AUTONOMOUS STEERING OF A VEHICLE

INTRODUCTION

The technical field generally relates to vehicle systems, and more particularly relates to autonomous operation of a vehicle configured for maintaining a static steering wheel position during autonomous vehicle steering.

The operation of modern vehicles is becoming more automated, that is, able to provide driving control with less driver intervention. In general, autonomous vehicles are vehicles that are capable of sensing their environment and navigating with little or no user input. Autonomous vehicles may sense their environment using sensing devices such as radar, lidar, image sensors, and the like. Autonomous vehicles may further use information from global positioning systems (GPS) technology, navigation systems, vehicle-to-vehicle communication, vehicle-to-infrastructure technology, and/or drive-by-wire systems for navigation.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true “driverless” vehicles correspond to higher automation levels.

As the industry transitions to autonomous vehicles, various opportunities may arise for improving user experience during autonomous operation of the vehicles. Accordingly, there is an ongoing desire for systems and methods that promote a positive user experience during autonomous vehicle operation. Furthermore, other desirable features and characteristics of the present disclosure will become apparent from the subsequent detailed description and the appended claims, taken in conjunction with the accompanying drawings and the foregoing introduction.

SUMMARY

A method is provided for maintaining a static steering wheel position during autonomous vehicle steering. In one example, the method includes maintaining a steering wheel of a steer-by-wire system of a vehicle in a stationary position while the vehicle is operating in an autonomous mode wherein steering of the vehicle is controlled by a controller of the vehicle, determining to switch steering control from the autonomous mode to a manual mode wherein steering of the vehicle is controlled by a driver of the vehicle with the steering wheel, and performing a synchronization process configured to synchronize a steering wheel angle and a road wheel angle in accordance with a predetermined steering ratio.

In various examples, performing the synchronization process may include turning wheels of the vehicle via a road wheel actuator to adjust the road wheel angle towards the steering wheel angle.

In various examples, performing the synchronization process may include turning the steering wheel via a steering wheel actuator to adjust the steering wheel angle towards the road wheel angle.

In various examples, the method may include monitoring for driver control of the steering wheel, rotating the steering wheel via a steering wheel actuator to adjust the steering wheel angle towards the road wheel angle while performing the synchronization process in response to determining that the driver does not have control of the steering wheel, and ceasing rotation of the steering wheel in response to determining that the driver has gained control of the steering wheel or in response to determining that the steering wheel angle and the road wheel angle are synchronized in accordance with the predetermined steering ratio. In various examples, the method may include turning wheels of the vehicle via a road wheel actuator to adjust the road wheel angle towards the steering wheel angle in response to determining that the steering wheel angle and the road wheel angle are not synchronized after ceasing rotation of the steering wheel.

In various examples, the method may include monitoring a rotational speed of the steering wheel while the driver has control of the steering wheel and while performing the synchronization process, pausing performance of the synchronization process in response to the rotational speed of the steering wheel being greater than a threshold, maintaining a current steering ratio while the synchronization process is paused, and resuming performance of the synchronization process in response to the rotational speed of the steering wheel being less than the threshold.

In various examples, the method may include modifying a steering ratio while performing the synchronization process to expedite performance of the synchronization process.

In various examples, the method may include generating a notification indicating that the synchronization process is being performed while performing the synchronization process.

A system is provided for maintaining a static steering wheel position during autonomous vehicle steering in a vehicle having a steer-by-wire system. In one example, the system includes a road wheel actuator configured to turn wheels of a vehicle and thereby adjust a road wheel angle of the vehicle, a steering wheel actuator configured to rotate a steering wheel of the vehicle and thereby adjust a steering wheel angle of the vehicle, and a controller functionally coupled with the road wheel actuator and the steering wheel actuator. The controller is configured to, by one or more processors: maintain the steering wheel in a stationary position while the vehicle is operating in an autonomous mode wherein steering of the vehicle is controlled by the vehicle, determine to switch steering control from the autonomous mode to a manual mode wherein steering of the vehicle is controlled by a driver of the vehicle with the steering wheel, and perform a synchronization process configured to synchronize the steering wheel angle and the road wheel angle in accordance with a predetermined steering ratio, wherein the synchronization process uses the road wheel actuator and/or the steering wheel actuator to synchronize the steering wheel angle and the road wheel angle.

In various examples, the controller of the system may be configured to, by the one or more processors, turn the wheels via the road wheel actuator to adjust the road wheel angle towards the steering wheel angle while performing the synchronization process.

In various examples, the controller of the system may be configured to, by the one or more processors, rotate the steering wheel via the steering wheel actuator to adjust the steering wheel angle towards the road wheel angle while performing the synchronization process.

In various examples, the controller of the system may be configured to, by the one or more processors: monitor for driver control of the steering wheel, rotate the steering wheel via the steering wheel actuator to adjust the steering wheel angle towards the road wheel angle while performing the synchronization process in response to determining that the driver does not have control of the steering wheel, and cease rotation of the steering wheel in response to determining that the driver has gained control of the steering wheel or in response to determining that the steering wheel angle and the road wheel angle are synchronized in accordance with the predetermined steering ratio. In various examples, the controller of the system may be configured to, by the one or more processors, turn the wheels via the road wheel actuator to adjust the road wheel angle towards the steering wheel angle in response to determining that the steering wheel angle and the road wheel angle are not synchronized after ceasing rotation of the steering wheel.

In various examples, the controller of the system may be configured to, by the one or more processors: monitor a rotational speed of the steering wheel while the driver has control of the steering wheel and while performing the synchronization process, pause the synchronization process in response to the rotational speed of the steering wheel being greater than a threshold, maintain a current steering ratio while the synchronization process is paused, and resume the synchronization process in response to the rotational speed of the steering wheel being less than the threshold.

In various examples, the controller of the system may be configured to, by the one or more processors, modify a steering ratio while performing the synchronization process to expedite the synchronization process.

In various examples, the controller of the system may be configured to, by the one or more processors, generate a notification indicating that the synchronization process is being performed while the synchronization process is being performed.

A vehicle is provided that, in one example, includes wheels rotatably coupled to a frame of the vehicle, a steering wheel configured to rotate and thereby turn the wheels via a steer-by-wire system, a road wheel actuator configured to turn the wheels and thereby adjust a road wheel angle, a steering wheel actuator configured to rotate the steering wheel and thereby adjust a steering wheel angle, and a controller functionally coupled with the road wheel actuator and the steering wheel actuator. The controller is configured to, by one or more processors: maintain the steering wheel in a stationary position while the vehicle is operating in an autonomous mode wherein steering of the vehicle is controlled by the vehicle, determine to switch steering control from the autonomous mode to a manual mode wherein steering of the vehicle is controlled by a driver of the vehicle with the steering wheel, and perform a synchronization process configured to synchronize the steering wheel angle and the road wheel angle in accordance with a predetermined steering ratio, wherein the synchronization process uses the road wheel actuator and/or the steering wheel actuator to synchronize the steering wheel angle and the road wheel angle.

In various examples, the controller of the vehicle may be configured to, by the one or more processors: turn the wheels via the road wheel actuator to adjust the road wheel angle towards the steering wheel angle while performing the synchronization process, and rotate the steering wheel via the steering wheel actuator to adjust the steering wheel angle towards the road wheel angle while performing the synchronization process.

In various examples, the controller of the vehicle may be configured to, by the one or more processors: monitor for driver control of the steering wheel, rotate the steering wheel via the steering wheel actuator to adjust the steering wheel angle towards the road wheel angle while performing the synchronization process in response to determining that the driver does not have control of the steering wheel, cease rotation of the steering wheel in response to determining that the driver has gained control of the steering wheel or in response to determining that the steering wheel angle and the road wheel angle are synchronized in accordance with the predetermined steering ratio, and turn the wheels via the road wheel actuator to adjust the road wheel angle towards the steering wheel angle in response to determining that the steering wheel angle and the road wheel angle are not synchronized after ceasing rotation of the steering wheel.

In various examples, the controller of the vehicle may be configured to, by the one or more processors: monitor a rotational speed of the steering wheel while the driver has control of the steering wheel and while performing the synchronization process, pause the synchronization process in response to the rotational speed of the steering wheel being greater than a threshold, maintain a current steering ratio while the synchronization process is paused, and resume the synchronization process in response to the rotational speed of the steering wheel being less than the threshold.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Examples of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples of the present disclosure may be practiced in conjunction with any number of systems, and that the systems described herein is merely examples of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example of the present disclosure.

Figure 1:
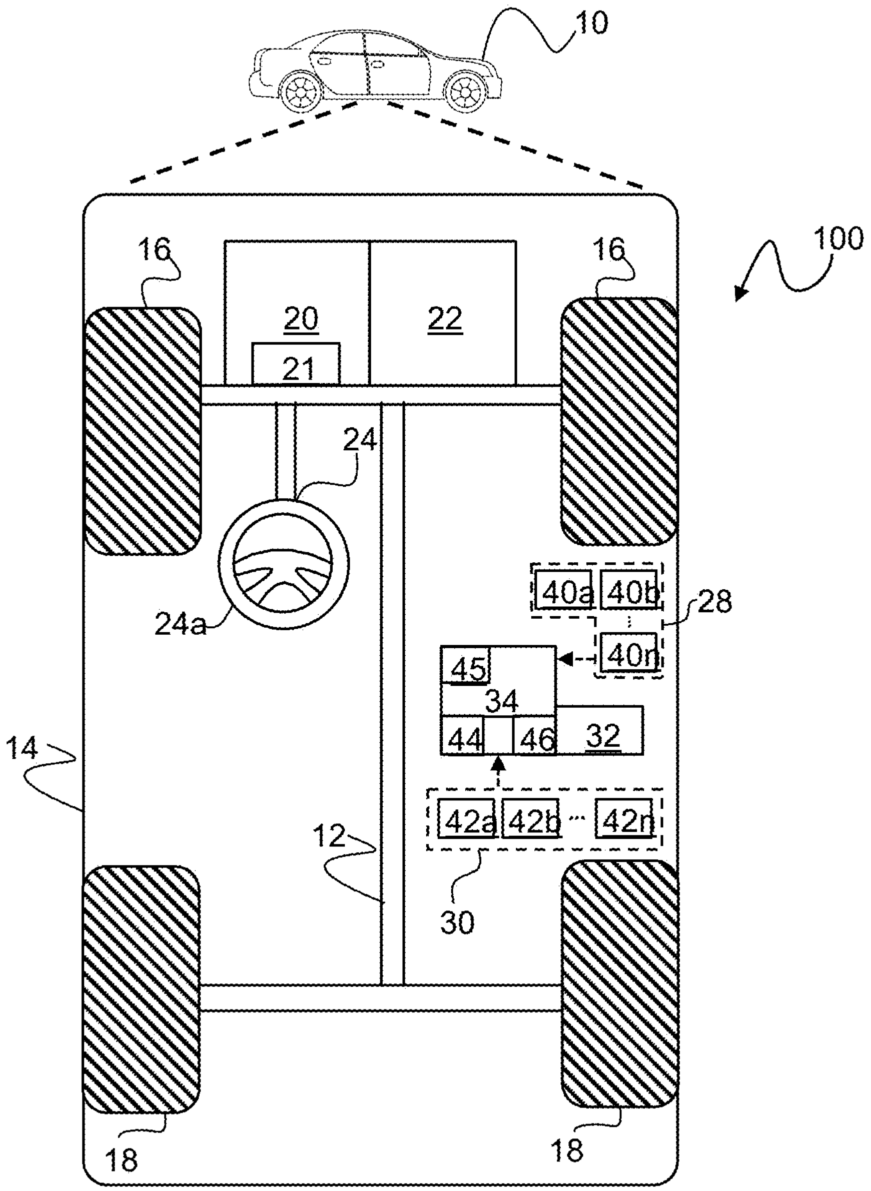
FIG. 1 is a functional block diagram illustrating an autonomous vehicle control system for a vehicle in accordance with various implementations.

Referring now to FIG. 1, in accordance with one or more implementations, an autonomous vehicle 10 is provided that includes a steering wheel control system 100 that is configured to maintain a steering wheel 24*a* of the vehicle 10 in a stationary or static position while the vehicle 10 is being steered by an autonomous driving system 70, and to synchronize the steering wheel 24*a* and wheels 16, 18 of the vehicle 10 prior to or in response to transfer of steering control to a driver of the vehicle 10.

In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In exemplary implementations, the vehicle 10 is an autonomous vehicle or is otherwise configured to support one or more autonomous operating modes, and the steering wheel control system 100 is incorporated into the vehicle 10. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks.

In some an exemplary implementation, the vehicle 10 is a so-called Level Three automation system. A Level Three system indicates "conditional driving automation," referring to the driving mode-specific performance by an automated driving system to control steering, acceleration and braking in most scenarios while a driver provides driver support to control certain driving tasks.

In some an exemplary implementation, the vehicle 10 is a so-called Level Four automation system. A Level Four system indicates "high driving automation," referring to the driving mode-specific performance by an automated driving system to control all driving tasks in specific scenarios while a driver optionally provides driver support to control driving tasks.

In some an exemplary implementation, the vehicle 10 is a so-called Level Five automation system. A Level Five system indicates "full driving automation," referring to the driving mode-specific performance by an automated driving system to control all driving tasks in all scenarios while a driver support is optional but not required.

As shown, the vehicle 10 generally includes a propulsion system 20, a transmission system 22, a steering system 24, a sensor system 28, an actuator system 30, at least one data storage device 32, at least one controller 34, and a communication system 36. The propulsion system 20 includes an engine and/or motor 21 such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16, 18 according to selectable speed ratios. According to various examples, the transmission system 22 may include a step-ratio automatic transmission, a continuously-variable transmission, or other appropriate transmission. The steering system 24 influences a position of the wheels 16, 18 and includes a steering wheel 24*a* operable via a steer-by-wire system.

The sensor system 28 includes one or more sensing devices 40*a*-40*n* that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40*a*-40*n*. The sensing devices 40*a*-40*n* can include, but are not limited to, radars, lidars, global positioning systems, optical cameras, thermal cameras, ultrasonic sensors, inertial measurement units, pressure sensors, position sensors, speed sensors, steering wheel angle sensors, and/or other sensors.

The actuator system 30 includes one or more actuator devices 42*a*-42*n* that control one or more vehicle features such as, but not limited to, the propulsion system 20, the transmission system 22, and/or the steering system 24.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The storage device 32 can be any suitable type of storage apparatus, including various different types of direct access storage and/or other memory devices. In one example, the storage device 32 comprises a program product from which a computer readable memory device can receive a program that executes one or more examples of one or more processes of the present disclosure, such as the steps of the process discussed further below in connection with FIGS. 4-6. In another example, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, examples of the vehicle 10 can include any number of controllers 34 that communicate over any suitable communication medium or a combination of communication mediums and that cooperate to process the sensor signals, perform logic, calculations, methods, and/or algorithms, and generate data.

As can be appreciated, that the controller 34 may otherwise differ from the example depicted in FIG. 1. For example, the controller 34 may be coupled to or may otherwise utilize one or more remote computer systems and/or other control systems, for example as part of one or more of the above-identified vehicle devices and systems. It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the controller 34 may also otherwise differ from the example depicted in FIG. 1, for example in that the computer system of the controller 34 may be coupled to or may otherwise utilize one or more remote computer systems and/or other control systems.

Still referring to FIG. 1, in exemplary implementations, the communication system 36 is configured to wirelessly communicate information to and from other entities 48 over a communication network, such as but not limited to, other vehicles ("V2V" communication,) infrastructure ("V2I" communication), remote systems, and/or personal devices. In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented using a standard wired network, a fiber or other optical network, a cable network, power lines, other wireless networks such as wireless local area networks (WLANs), or networks providing broadband wireless access (BWA), or any combination thereof.

Figure 2:
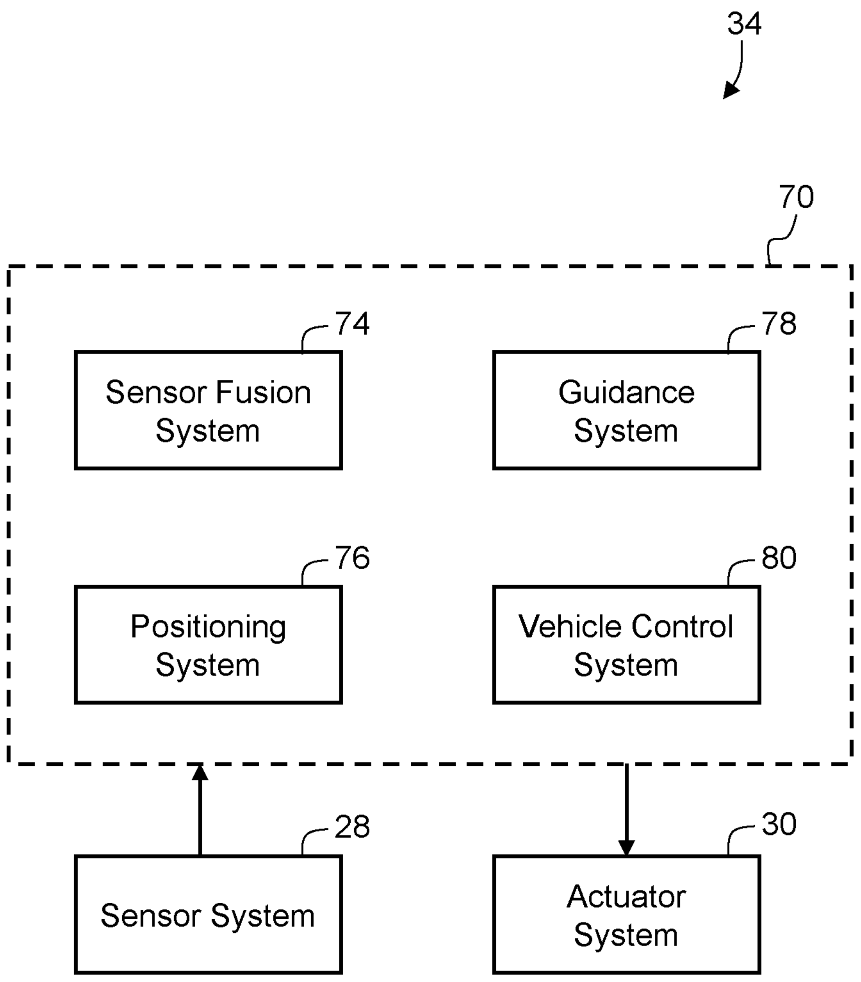
FIG. 2 is a block diagram of an automated driving system (ADS) suitable for implementation by the autonomous vehicle control system of the vehicle of FIG. 1 in accordance with various implementations.

Referring now to FIG. 2, in accordance with various implementations, controller 34 implements an autonomous driving system (ADS) 70. That is, suitable software and/or hardware components of controller 34 (e.g., processor 44 and computer-readable storage device 46) are utilized to provide the autonomous driving system 70 that is used in conjunction with vehicle 10, for example, to automatically control one or more of the actuator devices 42*a*-42*n* and thereby control vehicle acceleration, steering, and braking without human intervention.

In various implementations, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and vehicle pose. The vehicle control system 80 then generates control signals for controlling the vehicle 10 according to the determined path. In various implementations, the controller 34 implements machine learning techniques to assist the functionality of the controller 34, such as feature detection/classification, obstruction mitigation, route traversal, mapping, sensor integration, ground-truth determination, and the like.

In one or more implementations, the guidance system 78 includes a motion planning module that generates a motion plan for controlling the vehicle 10 as it traverses along a route. The motion planning module includes a longitudinal solver module that generates a longitudinal motion plan output for controlling the movement of the vehicle 10 along the route in the general direction of travel, for example, by causing the vehicle 10 to accelerate or decelerate at one or more locations in the future along the route to maintain a desired speed or velocity. The motion planning module also includes a lateral solver module that generates a lateral motion plan output for controlling the lateral movement of the vehicle 10 along the route to alter the general direction of travel, for example, by steering the vehicle 10 at one or more locations in the future along the route (e.g., to maintain the vehicle 10 centered within a lane, change lanes, etc.). The longitudinal and lateral plan outputs correspond to the commanded (or planned) path output provided to the vehicle control system 80 for controlling the actuator system 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle 10, and the lateral solver module attempts to optimize one or more of the steering angle, the rate of change of the steering angle, and the acceleration or second derivative of the steering angle, alternatively referred to herein as the lateral jerk of the vehicle 10. In this regard, the steering angle can be related to the curvature of the path or route, and any one of the steering angle, the rate of change of the steering angle, and the acceleration or second derivative of the steering angle can be optimized by the lateral solver module, either individually or in combination.

In exemplary implementations, the guidance system 78 supports a hands-free autonomous operating mode that controls steering, acceleration and braking while it is enabled and operating to provide lane centering while attempting to maintain a driver-selected speed and/or following distance (or gap time) relative to other vehicles using the current sensor data (or obstacle data) provided by the sensor fusion system 74 and the current vehicle pose provided by the positioning system 76. In the autonomous operating mode, the guidance system 78 includes or otherwise implements a lane change coordinator that analyzes route information (if available) in addition to data or other information from the sensor fusion system 74, the positioning system 76 and potentially other modules or systems to determine whether or not to initiate and execute a lane change from a current lane of travel to an adjacent lane of travel, for example, based on presence of slower moving traffic within the current lane of travel ahead of the vehicle 10 (e.g., to overtake or pass another vehicle), whether or not the current lane is ending or merging into an adjacent lane, whether a lane change is required to maintain travel along the desired route, and/or the like. In this regard, the lane change coordinator may automatically determine when to initiate a lane change and automatically configure the lateral solver module and/or the motion planning module to generate a corresponding lateral plan to change lanes in the desired manner and provide the lateral plan to the vehicle control system 80, which automatically generates corresponding control signals for autonomously controlling the actuator system 30 to maneuver the vehicle 10 and execute the lane change.

Figure 3:
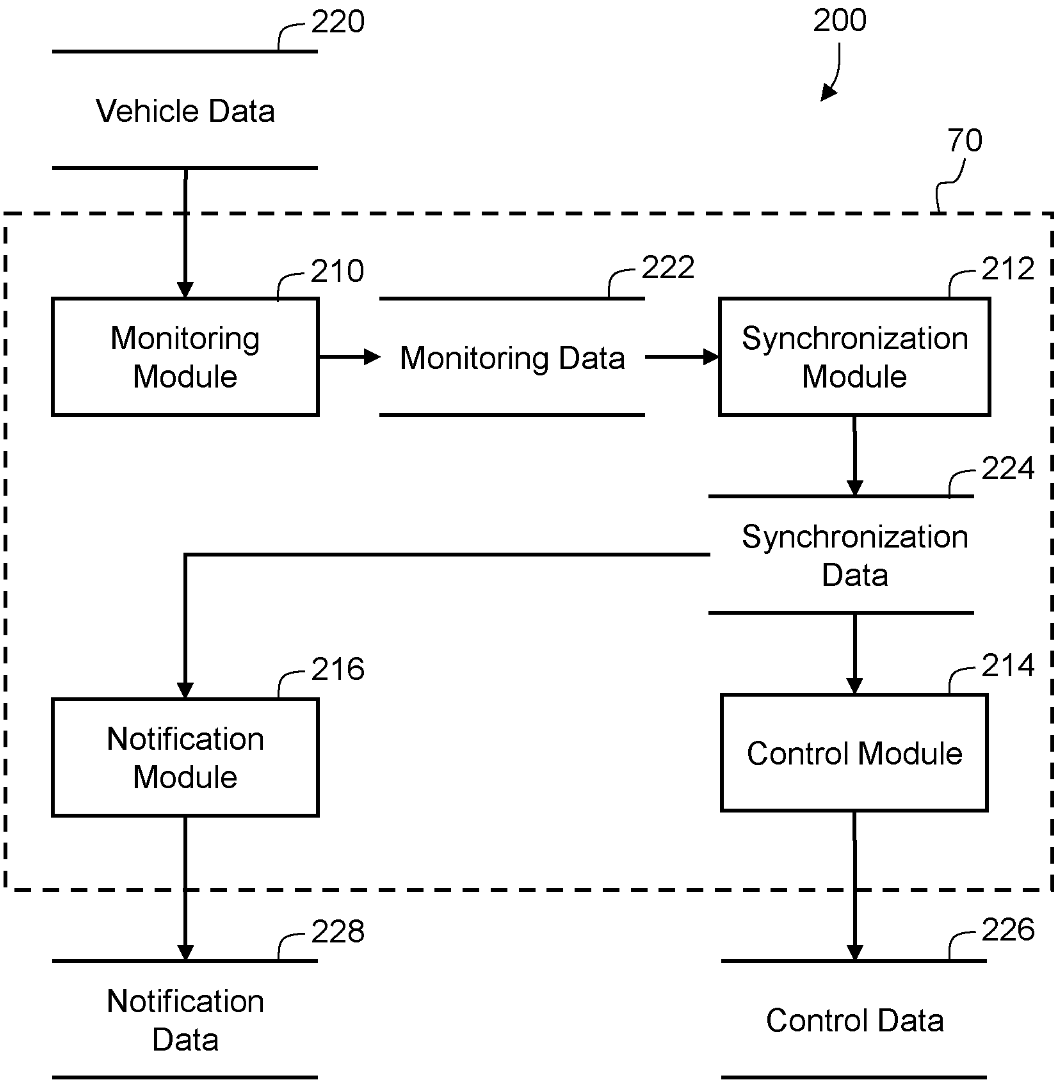
FIG. 3 is a dataflow diagram of an autonomous vehicle control system that includes a steering wheel control system suitable for use with the ADS of FIG. 2 in the autonomous vehicle control system of FIG. 1 according to one or more aspects described herein.

With reference to FIG. 3 and with continued reference to FIGS. 1-2, a dataflow diagram illustrates elements of the steering wheel control system 100 of FIG. 1 in accordance with various examples. As can be appreciated, various examples of the steering wheel control system 100 according to the present disclosure may include any number of modules embedded within the controller 34 which may be combined and/or further partitioned to similarly implement systems and methods described herein. Furthermore, inputs to the steering wheel control system 100 may be received from other control modules (not shown) associated with the vehicle 10, and/or determined/modeled by other sub-modules (not shown) within the controller 34. Furthermore, the inputs might also be subjected to preprocessing, such as sub-sampling, noise-reduction, normalization, feature-extraction, missing data reduction, and the like. In various examples, the steering wheel control system 100 includes a monitoring module 210, a synchronization module 212, a control module 214, and a notification module 216.

In various examples, the monitoring module 210 receives as input vehicle data 220 generated by one or more of the systems of the vehicle 10, such as the steering system 24 and/or the sensor system 28. The vehicle data 220 includes various data indicating various parameters of the vehicle state, such as whether a driver of the vehicle 10 is holding the steering wheel 24*a*, the steering wheel angle, the road wheel angle, a rotational speed of the steering wheel 24*a*, and the mode of the vehicle 10.

The monitoring module 210 continuously or periodically analyzes the vehicle data 220 to monitor the vehicle state in real-time to determine whether to perform synchronization of the steering wheel angle and the road wheel angle. The monitoring module 210 generates monitoring data 222 that includes various data indicating whether to perform a synchronization process and various other relevant parameters of the vehicle state. For example, the monitoring module 210 may determine to perform the synchronization process in response to the vehicle 10 requesting a transition from an autonomous mode to a manual mode, in response to the driver requesting a transition from an autonomous mode to the manual mode, or in response to the driver taking steering control via the steering wheel 24*a*.

In various examples, the synchronization module 212 receives as input the monitoring data 222 generated by the monitoring module 210. The synchronization module 212 determines, based on the monitoring data 222, how to synchronize the steering wheel angle and the road wheel angle. For example, a synchronization process may include rotating the steering wheel to adjust the steering wheel angle, turning the front wheels 16 to adjust the road wheel angle, modifying a steering ratio, or combinations thereof. The synchronization module 212 generates synchronization data 224 that includes various data indicating how to perform the synchronization process.

In various examples, the control module 214 receives as input the synchronization data 224 generated by the synchronization module 212. The control module 214 analyzes the synchronization data 224 and, based thereon, generates control data 226 that includes various data indicating instructions or commands configured to initiate the synchronization process, for example, by modifying the operation of one or more of the actuator devices 42*a*-42*n* to modifying the steering wheel angle and/or the road wheel angle. The control module 214 transmits the control data 226 to the one or more other systems of the vehicle 10, such as the actuator system 30 and/or the vehicle control system 80. In some examples, the control module 214 may be the vehicle control system 80 or a submodule thereof.

In various examples, the notification module 216 receives as input the synchronization data 224 generated by the synchronization module 212. The notification module 216 analyzes the synchronization data 224 and, based thereon, generates notification data 228 that includes various data indicating instructions or commands configured to initiate generation of a notification for the driver of the vehicle 10. In some examples, the notification may include an audible and/or visual element. In some examples, the notification may include a visual symbol, icon, marker, or message displayed on, for example, a display screen and/or a dashboard of the vehicle 10. The notification module 216 transmits the notification data 228 to one or more other systems of the vehicle 10, such as a display system.

Figure 4:
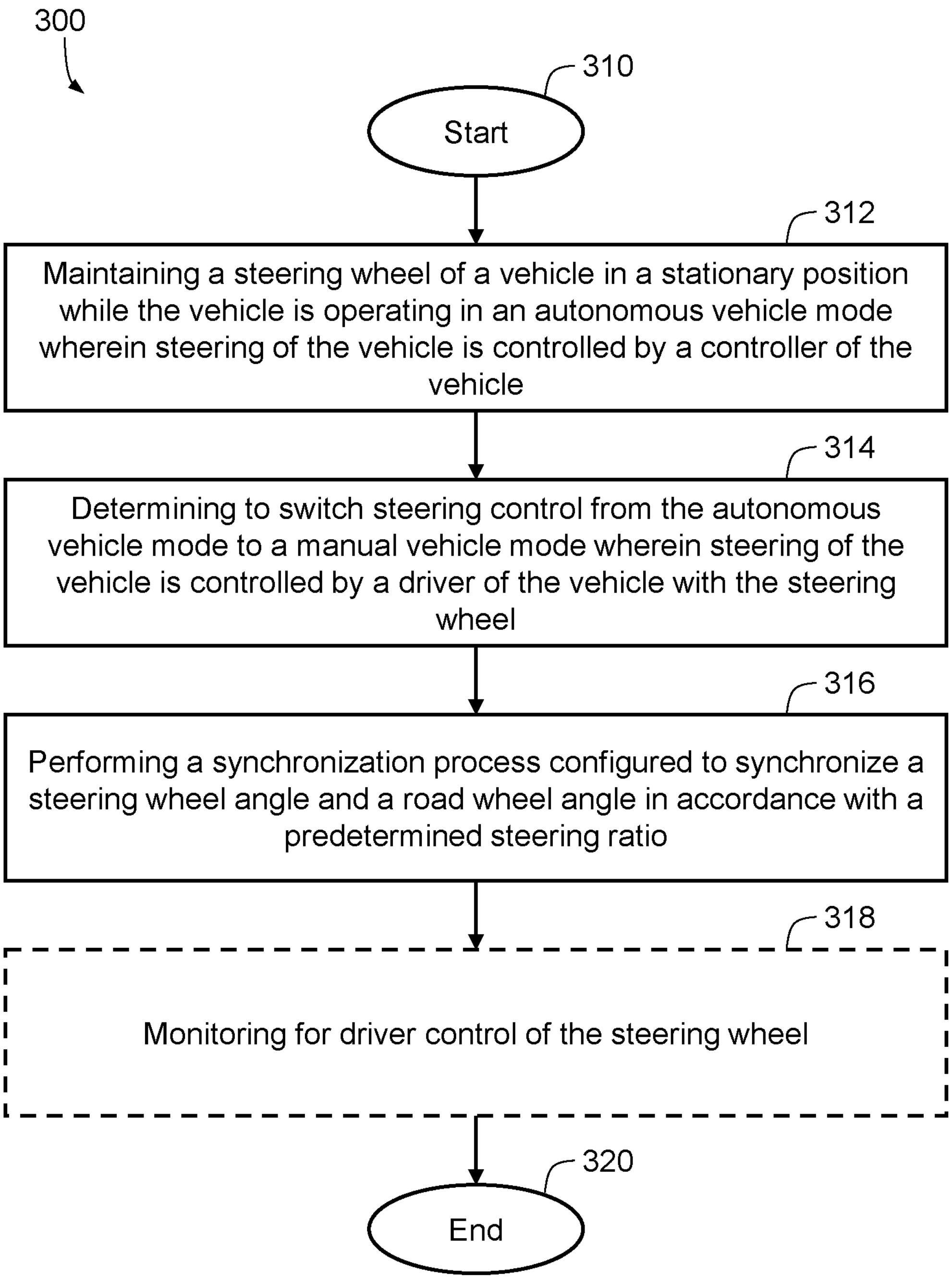
FIG. 4 depicts a flow diagram of an exemplary method for steering wheel control during autonomous steering according to one or more aspects described herein.

With reference now to FIG. 4 and with continued reference to FIGS. 1-3, a flowchart provides a method 300 for operating the vehicle 10 as performed by the steering wheel control system 100, in accordance with various examples. As can be appreciated in light of the disclosure, the order of operation within the method 300 is not limited to the sequential execution as illustrated in FIG. 4, but may be performed in one or more varying orders as applicable and in accordance with the present disclosure. In various examples, the method 300 can be scheduled to run based on one or more predetermined events, and/or can run continuously during operation of the vehicle 10.

In one example, the method 300 may start at 310. At 312, the method 300 may include operating the vehicle 10 in an autonomous mode wherein steering of the vehicle 10 is controlled by the ADS 70 without intervention by the driver. While the ADS 70 is steering the vehicle 10, the method 300 includes maintaining the steering wheel 24*a* in a centered and/or stationary position, that is, the steering wheel 24*a* does not rotate when the ADS 70 turns the front wheels 16.

At 314, the method 300 may include determining to switch steering control from the autonomous mode to a manual mode wherein steering of the vehicle 10 is controlled by the driver of the vehicle 10 with the steering wheel 24*a*. In some examples, this determination may be made by the ADS 70, for example, due to changing driving conditions or in response to a request by the driver, and the determination may be communicated with the controller 34.

At 316, the method 300 may include performing a synchronization process that includes synchronizing the steering wheel angle and the road wheel angle of the vehicle 10 until the steering wheel angle and the road wheel angle match in accordance with a predetermined steering ratio. In some examples, the synchronization process may include rotating the steering wheel 24*a* to adjust the steering wheel angle towards the road wheel angle and/or turning the front wheels 16 to adjust the road wheel angle towards the steering wheel angle. In some examples, the synchronization process may be performed based on the vehicle state.

At 318, the method 300 may optionally include monitoring for driver control of the steering wheel 24*a*, for example, whether the driver is holding the steering wheel 24*a* and/or rotating the steering wheel 24*a*. In such examples, the method 300 may include modifying the synchronization process in response to detecting that the driver has gained control of the steering wheel 24*a*. The method 300 may end at 320.

Figure 5:
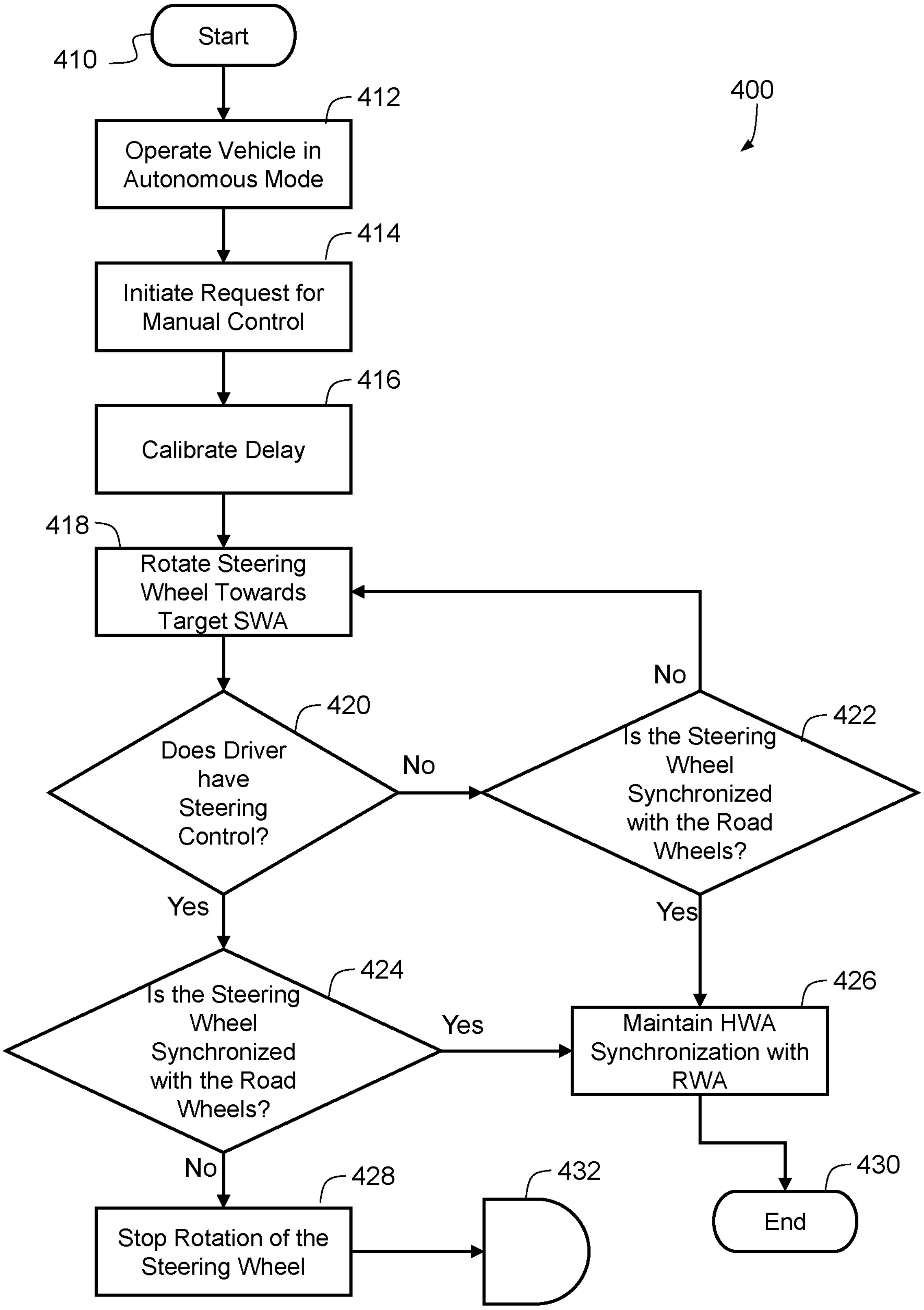
FIG. 5 depicts a flow diagram of a first exemplary method for synchronizing a steering wheel angle and a road wheel angle during a transition from an autonomous mode to a manual mode according to one or more aspects described herein.
Figure 6:
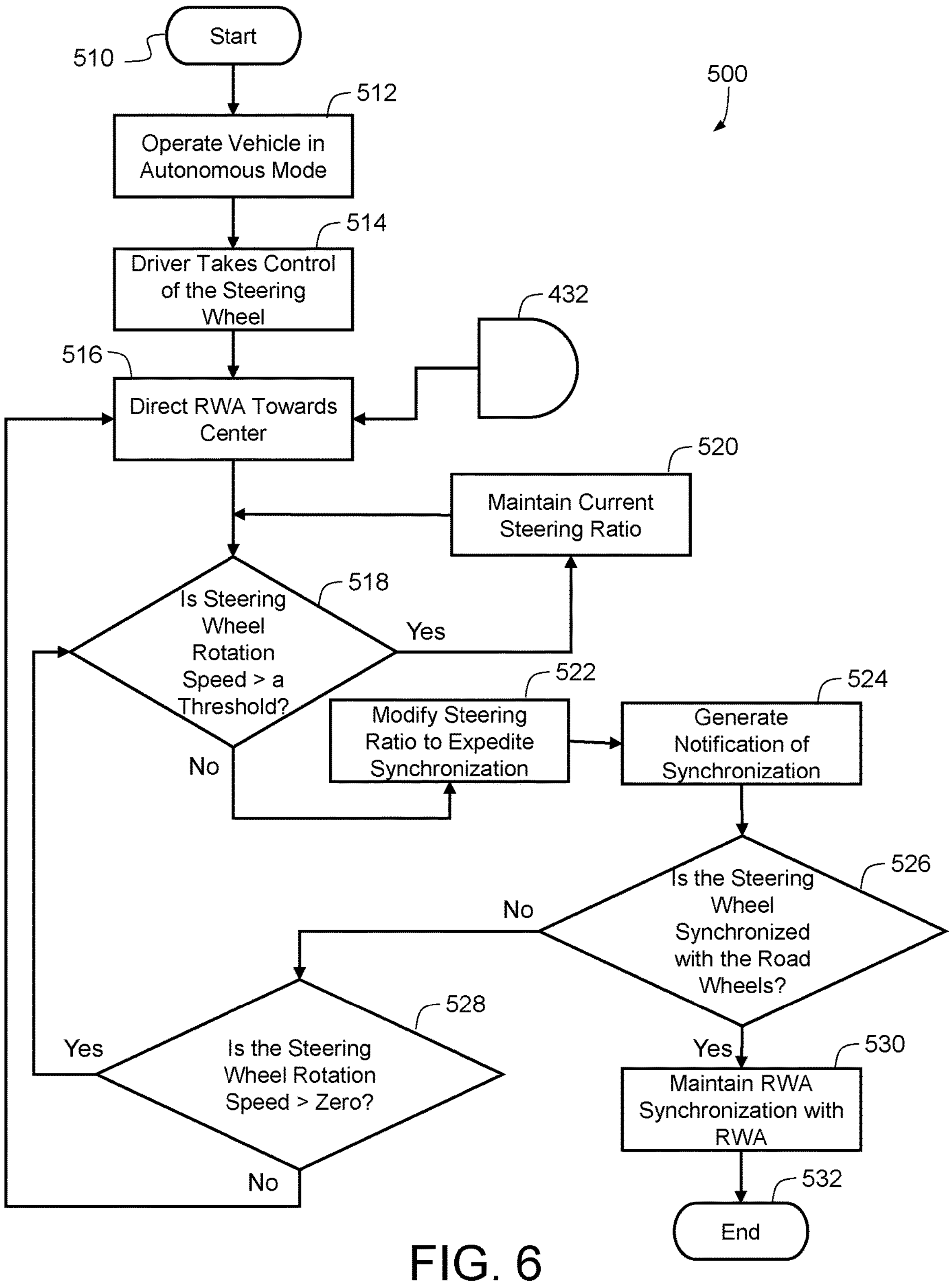
FIG. 6 depicts a flow diagram of a second exemplary method for synchronizing a steering wheel angle and a road wheel angle during a transition from an autonomous mode to a manual mode according to one or more aspects described herein.

With reference now to FIGS. 5 and 6 and with continued reference to FIGS. 1-4, a pair of flowcharts provide methods 400 and 500, respectively, for operating the vehicle 10 as performed by the steering wheel control system 100, in accordance with various examples. As can be appreciated in light of the disclosure, the order of operation within the methods 400 and 500 are not limited to the sequential execution as illustrated in FIGS. 5 and 6, but may be performed in one or more varying orders as applicable and in accordance with the present disclosure. In various examples, the methods 400 and/or 500 can each be scheduled to run based on one or more predetermined events, and/or can run continuously during operation of the vehicle 10.

Referring initially to FIG. 4, in one example, the method 400 may start at 410. At 412, the method 400 may include operating the vehicle 10 in the autonomous mode wherein steering of the vehicle 10 is controlled by the ADS 70 without intervention by the driver. While the ADS 70 is steering the vehicle 10, the method 400 includes maintaining the steering wheel 24*a* in a centered and/or stationary position, that is, the steering wheel 24*a* does not rotate when the ADS 70 turns the front wheels 16.

At 414, the method 400 may include initiating a request for transition from the autonomous mode to a manual mode wherein steering of the vehicle 10 is controlled by the driver of the vehicle 10 with the steering wheel 24*a*, for example, due to changing driving conditions.

At 416, the method 400 may include calibrating a delay for the transition to provide sufficient time to synchronize the steering wheel angle and the road wheel angle. The duration of the delay may be adjusted based on various factors such as the difference between the steering wheel angle and the road wheel angle, the speed of the vehicle 10, the reason for the transition, etc.

At 418, the method 400 may include rotating the steering wheel 24*a* in a direction such that the steering wheel angle approaches the road wheel angle. In some examples, the steering wheel 24*a* may be rotated towards a target steering wheel angle.

At 420, the method 400 may include determining whether the driver has steering control. For example, the method 400 may including detecting that the driver is holding the steering wheel 24*a* and/or is turning the steering wheel 24*a*. If a determination is made that the driver does not have steering control, the method 400 may continue to 422. If a determination is made that the driver does have steering control, the method 400 may continue to 424.

At 422, the method 400 may include determining whether the steering wheel angle and the road wheel angle are synchronized in accordance with a predetermined steering ratio. If a determination is made that the steering wheel angle and the road wheel angle are not synchronized, the method 400 may return to 418. If a determination is made that the steering wheel angle and the road wheel angle are synchronized, the method 400 may continue to 426.

At 424, the method 400 may include determining whether the steering wheel angle and the road wheel angle are synchronized in accordance with a predetermined steering ratio. If a determination is made that the steering wheel angle and the road wheel angle are synchronized, the method 400 may continue to 426. If a determination is made that the steering wheel angle and the road wheel angle are not synchronized, the method 400 may continue to 428.

At 426, the method 400 may include maintaining the synchronization between steering wheel angle and the road wheel angle, and the method 400 may end at 430.

At 428, the method 400 may include stopping or ceasing rotation of the steering wheel 24*a*, and the method 400 may continue to at 432 to transition to the method 500.

Referring now to FIG. 5, in one example, the method 500 may start at 510. At 512, the method 500 may include operating the vehicle 10 in the autonomous mode wherein steering of the vehicle 10 is controlled by the ADS 70 without intervention by the driver. While the ADS 70 is steering the vehicle 10, the method 500 includes maintaining the steering wheel 24*a* in a centered and/or stationary position, that is, the steering wheel 24*a* does not rotate when the ADS 70 turns the front wheels 16.

At 514, the method 500 may include determining that the driver has steering control. For example, the method 500 may including detecting that the driver is holding the steering wheel 24*a* and/or is turning the steering wheel 24*a*.

At 516, the method 500 may include directing the road wheel angle towards the steering wheel angle, for example, towards the center position.

At 518, the method 500 may include determining whether the rotational speed of the steering wheel 24*a* exceeds a threshold. In some examples, the threshold may correspond to an intervention by the driver to avoid an obstacle (e.g., quick swerve). If the rotational speed exceeds the threshold, the method 500 may continue to 520. If the rotational speed does not exceed the threshold, the method 500 may continue to 522.

At 520, the method 500 may include pausing the synchronization process and maintaining a current steering ratio and thereby allow the driver to manually steer the vehicle 10 without interference by the ADS 70. The method 520 may return to 518 and potentially resume the synchronization process upon the rotational speed of the steering wheel 24*a* dropping below the threshold.

At 522, the method 500 may include modifying the steering ratio to expedite the synchronization process. For example, the steering ratio may be adjusted to reduce a number of degrees that the steering wheel must rotate to turn the front wheels 16. Typically, the steering ratio is expressed as a ratio of x:y, wherein x is the number of degrees the steering wheel 24*a* turns and y is the number of degrees the front wheels 16 turn (e.g., 16:1).

At 524, the method 500 may include generating a notification intended to indicate to the driver that the synchronization process is currently being performed. For example, a symbol or icon may be displayed on a dashboard of the vehicle 10 during the synchronization process.

At 526, the method 500 may include determining whether the steering wheel angle and the road wheel angle are synchronized in accordance with a predetermined steering ratio. If a determination is made that the steering wheel angle and the road wheel angle are not synchronized, the method 500 may continue to 528. If a determination is made that the steering wheel angle and the road wheel angle are synchronized, the method 500 may continue to 530.

At 528, the method 500 may include determining whether the rotational speed of the steering wheel 24*a* is greater than zero. If the rotational speed is greater than zero, the method 500 may return to 518. If the rotational speed is zero, the method 500 may return to 516.

At 530, the method 500 may include maintaining the synchronization between steering wheel angle and the road wheel angle, and the method 500 may end at 532.

The systems and methods disclosed herein provide various benefits over certain existing systems and methods. For example, existing systems and methods that rotate the steering wheel during autonomous modes may cause the steering wheel to block visibility of the dashboard, distract the driver, etc. In contrast, the systems and methods disclosed herein provide for the steering wheel to remain stationary while the vehicle is operating in L2 or greater autonomous modes, and provide for transfer of steering control from the vehicle to the driver. Optionally, the systems and methods may provide for the driver to take steering control from the vehicle and/or give the steering control to the vehicle immediately. Without a steering wheel moving all the time (or with reduced angle), the driver may be able to relax, have improved dashboard visibility, and/or have easier access to controls in the steering wheel. In some examples, steering wheels may be modified to provide additional functionality while stationary. For example, the steering wheel may include a display for additional enjoyment to the driver.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:

maintaining, with a controller having one or more processors, a steering wheel of a steer-by-wire system of a vehicle in a stationary position while the vehicle is operating in an autonomous mode wherein steering of the vehicle is controlled by a controller of the vehicle;

determining, with the controller having the one or more processors, to switch steering control from the autonomous mode to a manual mode wherein steering of the vehicle is controlled by a driver of the vehicle with the steering wheel;

performing, with the controller having the one or more processors, a synchronization process configured to synchronize a steering wheel angle and a road wheel angle in accordance with a predetermined steering ratio;

monitoring a rotational speed of the steering wheel while the driver has control of the steering wheel and while performing the synchronization process;

pausing performance of the synchronization process in response to the rotational speed of the steering wheel being greater than a threshold;

maintaining a current steering ratio while the synchronization process is paused; and resuming performance of the synchronization process in response to the rotational speed of the steering wheel being less than the threshold.

2. The method of claim 1, wherein performing the synchronization process includes turning, with the controller having the one or more processors, wheels of the vehicle via a road wheel actuator to adjust the road wheel angle towards the steering wheel angle.

3. The method of claim 1, wherein performing the synchronization process includes turning, with the controller having the one or more processors, the steering wheel via a steering wheel actuator to adjust the steering wheel angle towards the road wheel angle.

4. The method of claim 1, further comprising, with the controller having the one or more processors:

monitoring for driver control of the steering wheel;

rotating the steering wheel via a steering wheel actuator to adjust the steering wheel angle towards the road wheel angle while performing the synchronization process in response to determining that the driver does not have control of the steering wheel; and ceasing rotation of the steering wheel in response to determining that the driver has gained control of the steering wheel or in response to determining that the steering wheel angle and the road wheel angle are synchronized in accordance with the predetermined steering ratio.

5. The method of claim 4, further comprising turning, with the controller having the one or more processors, wheels of the vehicle via a road wheel actuator to adjust the road wheel angle towards the steering wheel angle in response to determining that the steering wheel angle and the road wheel angle are not synchronized after ceasing rotation of the steering wheel.

6. The method of claim 1, further comprising modifying, with the controller having the one or more processors, a steering ratio while performing the synchronization process to expedite performance of the synchronization process.

7. The method of claim 1, further comprising generating, with the controller having the one or more processors, a notification indicating that the synchronization process is being performed while performing the synchronization process.

8. A system, comprising:

a road wheel actuator configured to turn wheels of a vehicle and thereby adjust a road wheel angle of the vehicle;

a steering wheel actuator configured to rotate a steering wheel of the vehicle and thereby adjust a steering wheel angle of the vehicle; and a controller functionally coupled with the road wheel actuator and the steering wheel actuator, wherein the controller is configured to, by one or more processors:

maintain the steering wheel in a stationary position while the vehicle is operating in an autonomous mode wherein steering of the vehicle is controlled by the vehicle;

determine to switch steering control from the autonomous mode to a manual mode wherein steering of the vehicle is controlled by a driver of the vehicle with the steering wheel;

perform a synchronization process configured to synchronize the steering wheel angle and the road wheel angle in accordance with a predetermined steering ratio, wherein the synchronization process uses the road wheel actuator and/or the steering wheel actuator to synchronize the steering wheel angle and the road wheel angle;

monitor a rotational speed of the steering wheel while the driver has control of the steering wheel and while performing the synchronization process;

pause the synchronization process in response to the rotational speed of the steering wheel being greater than a threshold;

maintain a current steering ratio while the synchronization process is paused; and resume the synchronization process in response to the rotational speed of the steering wheel being less than the threshold.

9. The system of claim 8, wherein the controller is configured to, by the one or more processors, turn the wheels via the road wheel actuator to adjust the road wheel angle towards the steering wheel angle while performing the synchronization process.

10. The system of claim 8, wherein the controller is configured to, by the one or more processors, rotate the steering wheel via the steering wheel actuator to adjust the steering wheel angle towards the road wheel angle while performing the synchronization process.

11. The system of claim 8, wherein the controller is configured to, by the one or more processors:

monitor for driver control of the steering wheel;

rotate the steering wheel via the steering wheel actuator to adjust the steering wheel angle towards the road wheel angle while performing the synchronization process in response to determining that the driver does not have control of the steering wheel; and cease rotation of the steering wheel in response to determining that the driver has gained control of the steering wheel or in response to determining that the steering wheel angle and the road wheel angle are synchronized in accordance with the predetermined steering ratio.

12. The system of claim 11, wherein the controller is configured to, by the one or more processors, turn the wheels via the road wheel actuator to adjust the road wheel angle towards the steering wheel angle in response to determining that the steering wheel angle and the road wheel angle are not synchronized after ceasing rotation of the steering wheel.

13. The system of claim 8, wherein the controller is configured to, by the one or more processors, modify a steering ratio while performing the synchronization process to expedite the synchronization process.

14. The system of claim 8, wherein the controller is configured to, by the one or more processors, generate a notification indicating that the synchronization process is being performed while the synchronization process is being performed.

15. A vehicle, comprising:

wheels rotatably coupled to a frame of the vehicle;

a steering wheel configured to rotate and thereby turn the wheels via a steer-by-wire system;

a road wheel actuator configured to turn the wheels and thereby adjust a road wheel angle;

a steering wheel actuator configured to rotate the steering wheel and thereby adjust a steering wheel angle; and a controller functionally coupled with the road wheel actuator and the steering wheel actuator, wherein the controller is configured to, by one or more processors:

maintain the steering wheel in a stationary position while the vehicle is operating in an autonomous mode wherein steering of the vehicle is controlled by the vehicle;

determine to switch steering control from the autonomous mode to a manual mode wherein steering of the vehicle is controlled by a driver of the vehicle with the steering wheel;

perform a synchronization process configured to synchronize the steering wheel angle and the road wheel angle in accordance with a predetermined steering ratio, wherein the synchronization process uses the road wheel actuator and/or the steering wheel actuator to synchronize the steering wheel angle and the road wheel angle;

monitor a rotational speed of the steering wheel while the driver has control of the steering wheel and while performing the synchronization process;

pause the synchronization process in response to the rotational speed of the steering wheel being greater than a threshold;

maintain a current steering ratio while the synchronization process is paused; and resume the synchronization process in response to the rotational speed of the steering wheel being less than the threshold.

16. The vehicle of claim 15, wherein the controller is configured to, by the one or more processors:

turn the wheels via the road wheel actuator to adjust the road wheel angle towards the steering wheel angle while performing the synchronization process; and rotate the steering wheel via the steering wheel actuator to adjust the steering wheel angle towards the road wheel angle while performing the synchronization process.

17. The vehicle of claim 15, wherein the controller is configured to, by the one or more processors:

monitor for driver control of the steering wheel;

rotate the steering wheel via the steering wheel actuator to adjust the steering wheel angle towards the road wheel angle while performing the synchronization process in response to determining that the driver does not have control of the steering wheel;

cease rotation of the steering wheel in response to determining that the driver has gained control of the steering wheel or in response to determining that the steering wheel angle and the road wheel angle are synchronized in accordance with the predetermined steering ratio; and turn the wheels via the road wheel actuator to adjust the road wheel angle towards the steering wheel angle in response to determining that the steering wheel angle and the road wheel angle are not synchronized after ceasing rotation of the steering wheel.

18. The method of claim 1, further comprising:

receiving, with the controller having the one or more processors, vehicle data indicative of one or more parameters of the vehicle state; and determining, with the controller having the one or more processors, how to synchronize the steering wheel angle and the road wheel angle based on the vehicle data.

19. The method of claim 18, wherein the vehicle data includes whether a driver of the vehicle is holding the steering wheel, the steering wheel angle, the road wheel angle, a rotational speed of the steering wheel, and the mode of the vehicle.

20. The method of claim 1, further comprising calibrating a delay for the transition to provide sufficient time to synchronize the steering wheel angle and the road wheel angle.

* * * * *